United States Patent [19]

Brdar et al.

[11] Patent Number: 5,229,714

[45] Date of Patent: Jul. 20, 1993

[54] CONDUCTOR CONNECTING MEANS IN A RPM SENSOR, AND METHOD FOR PRODUCING A RPM SENSOR

[75] Inventors: Milo Brdar; Hans-Juergen Herderich, both of Anderson, S.C.; Paul Hund, Schwieberdingen, Fed. Rep. of Germany

[73] Assignee: Robert Bosch GmbH, Stuttgart, Fed. Rep. of Germany

[21] Appl. No.: 849,252

[22] Filed: Mar. 11, 1992

[30] Foreign Application Priority Data

Apr. 12, 1991 [DE] Fed. Rep. of Germany ....... 9104463

[51] Int. Cl.$^5$ .................... G01P 3/488; H01F 15/10; H01F 27/30; G01R 3/00
[52] U.S. Cl. ................................. 324/173; 29/602.1; 324/174; 324/207.15; 336/192
[58] Field of Search ............... 324/173, 174, 207.15, 324/207.16, 207.25; 29/602.1, 605–607; 336/192

[56] References Cited

U.S. PATENT DOCUMENTS

| | | | |
|---|---|---|---|
| 4,105,985 | 8/1978 | Plunkett | 336/192 X |
| 4,546,340 | 10/1985 | Kuchuris | 336/192 |
| 4,649,361 | 3/1987 | Horn et al. | 29/602.1 X |
| 4,660,015 | 4/1987 | Finck et al. | 336/192 |
| 4,931,728 | 6/1990 | Hata et al. | 336/192 X |
| 5,039,942 | 8/1991 | Buchschmid et al. | 324/207.15 X |
| 5,097,242 | 3/1992 | Onishi et al. | 336/192 |

FOREIGN PATENT DOCUMENTS 8815681 4/1990 Fed. Rep. of Germany .

Primary Examiner—Gerard R. Strecker
Attorney, Agent, or Firm—Edwin E. Greigg; Ronald E. Greigg

[57] ABSTRACT

An rpm sensor, in which an electrically conductive connection between a coil and two electrical lines, leading to the outside via current rails, can be made in a single welding operation each. The rpm sensor is intended for use in anti-lock vehicle brake systems.

3 Claims, 1 Drawing Sheet

CONDUCTOR CONNECTING MEANS IN A RPM SENSOR, AND METHOD FOR PRODUCING A RPM SENSOR

BACKGROUND OF THE INVENTION

The invention is based on an rpm sensor as defined hereinafter. An rpm sensor of this kind is known (German Utility Model 88 15 681).

German Utility Model 8815681 is similar to the teaching in U.S. Pat. Nos. 4,931,728 and 5,097,242. Each of these patents relates to a rpm sensor which includes a coil with wire ends. Each of the wire ends are wound around conductor rail ends and soldered in place. The conductor wires that connect the rails with an electrical line outside of the sensor are then secured in place in a separate step by crimping the ends of the conductor rails.

This kind of procedure is inconvenient and expensive.

OBJECT AND SUMMARY OF THE INVENTION

An object of the invention is to avoid this disadvantage and to create an rpm sensor in which the operations of connecting the lines are reduced and simplified.

The invention wiill be better understood and further objects and advantages thereof will become more apparent from the ensuing detailed description of a preferred embodiment taken in conjunction with the drawings.

DESCRIPTION OF THE PREFERRED EMBODIMENT

Figure 1:
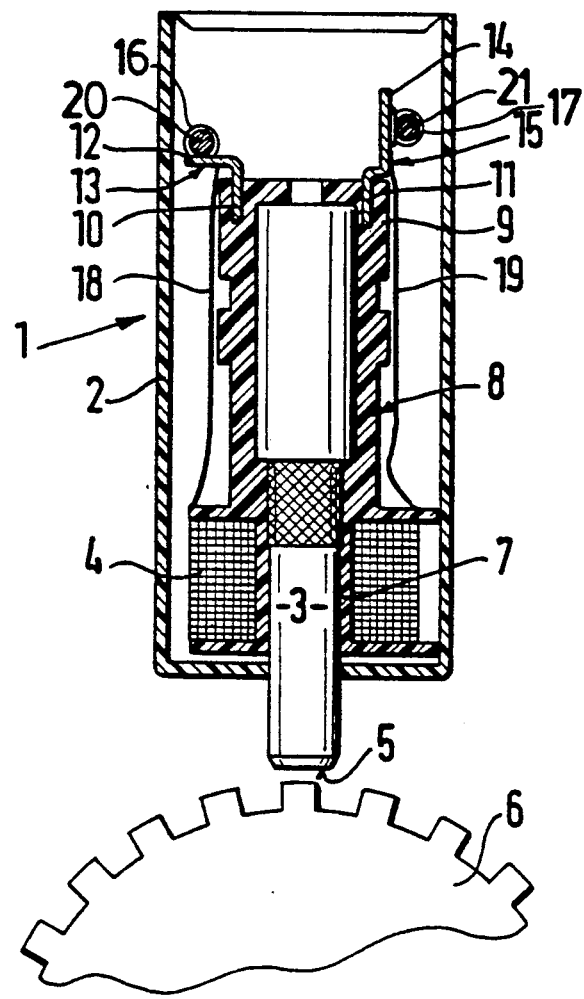
FIG. 1 is an overall sectional view of the rpm sensor.

An rpm sensor 1 has a sleeve 2, in which a sensor pin 3 and a coil 4 receiving it are disposed.

If the rpm sensor 1 is mounted on a vehicle wheel, for instance, then one end face 5 of the sensor pin 3 faces a pulse ring, suggested at 6 in the drawing.

The coil 4 is supported by one end 7 of a holder 8, into the other end 9 of which two current rail bases 10 and 11 are fixed by casting. One free end 12 of a current rail 13 is bent at a right angle, but as demonstrated by a free end 14 of the current rail 15 shown on the right in FIG. 1, it may also be bent twice at a right angle and then extend in the same direction as the current rail base 11.

Before assembly of the sensor pin, coil, etc. into the sleeve 2 the coil wires, current rails and electrical lead lines are secured in place.

Electrical lines 16 and 17 in the form of flexible cords are secured to both ends 12 and 14 of the current rails, respectively. Two wire ends 18 and 19 of the coil 4 are also extended to the ends 12 and 14 of the current rails, respectively.

Figure 2:
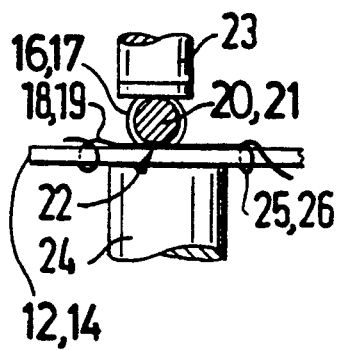
FIGS. 2 and 3 show the welding of the connection between the current rail, the coil wire and the electrical line.
Figure 3:
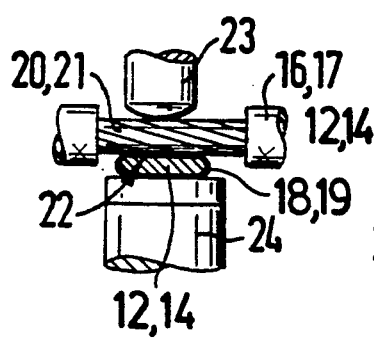
Figure 4:
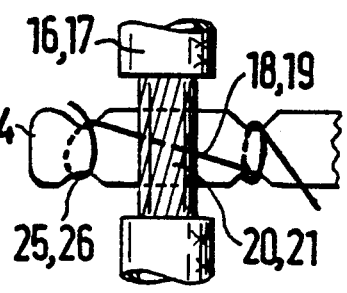
FIG. 4 shows the finished connection.

When the current connection is made, the procedure is in general such that the two wire ends 18 and 19 of the coil 14 are bent at an angle and guided along the coil holder 8 to the current rail ends 12 and 14. The wire ends 18 and 19 are then wrapped with a single or multiple winding 25 and 26 around the ends 12 and 14 of the current rails, as best seen from FIGS. 2 and 4. They still have their insulating lacquer coating at that time.

Next, the two insulated electrical lines 16 and 17 are stripped of insulation in such a way that their flexible cords 20 and 21 are bare in the region of the contact point 22 with the current rail ends 12 and 14 and the wire end 18 or 19.

Now, this three-part structure is moved in between an upper and a lower welding electrode 23 and 24 and welded. In this process the insulating lacquer coating of the two wire ends 18 and 19 melts, and in only a single operation a fixed and reliable current-carrying connection from the coil 4 to the electrical lines 16 and 17 is created.

Next, the sleeve 2 is slipped on, as a result of which the rpm sensor 1 is now ready for installation.

The foregoing relates to a preferred exemplary embodiment of the invention, it being understood that other variants and embodiments thereof are possible with the spirit and scope of the invention, the latter being defined by the appended claims.

What is claimed and desired to be secured by Letters Patent of the United States is:

1. An rpm sensor for the wheels of motor vehicles having an anti-lock system, having a sleeve, a coil wound on a coil body in said sleeve, a sensor pin disposed in said coil body and extending from said sleeve for facing a toothed pulse ring of a rotating vehicle wheel, first and second separate current rails in said sleeve secured to said coil body, said coil includes first and second separate wire ends (18 and 19) extending respectively to said first and second separate current rails in said sleeve, first and second separate electrical lines extend into said sleeve, each of said first and second separate wire ends of the coil (4) are wrapped with at least one winding (25, 26) onto one end (12, 14) of each of said first and second current rails with said wire ends between said current rails and one each of said first and second separate electrical lines, the first and second separate electrical lines (16, 17), the first and second current rail ends (12, 14), and the at least one winding of each of said first and second wire ends (18, 19) of the coil (4), respectively, are welded together in a single operation to form electrical conductive connections with the first and second current rails.

2. An rpm sensor as defined by claim 1, in which an insulating lacquer on the wire ends (18, 19) of the coil (4) is stripped automatically in the course of the welding.

3. A method of forming an rpm sensor for determining rotation of the wheels of a motor vehicle, which comprises, forming a cylindrical sleeve, forming a coil separate from said cylindrical sleeve, forming a supporting holder which supports said coil to form a coil body with said holder extending axially from said coil body, placing a sensor pin in said coil body with one end extending from said coil body and one end extending along and within said supporting holder, securing said sensor pin within said supporting holder and securing two separate current rails to said supporting holder, placing separate insulated connecting wires juxtaposed said current rails, stripping the insulation from the insulated connecting wires along a portion thereof juxtaposed said current rails, extending opposite wire ends of said coil up to said current rails and wrapping said wire ends with at least one winding of each of said wire ends to surround one each of said current rails and with a portion beneath said insulated portion of said connecting wires juxtaposed said current rails, welding the stripped portions of said connecting wires, and said wire ends beneath said connecting wires to said current rails, and slipping the sleeve over said coil body and support holder with one end of said sensor pin extending from said sleeve and with insulated portions of said connecting wires extending from said sleeve.

* * * * *